US008250615B2

(12) United States Patent
Yu

(10) Patent No.: US 8,250,615 B2
(45) Date of Patent: Aug. 21, 2012

(54) HEAD-END SYSTEM FOR PROVIDING TWO-WAY VOD SERVICE AND SERVICE METHOD THEREOF

(75) Inventor: Ho Sang Yu, Pyeongtaek Si (KR)

(73) Assignee: Alticast Co., Ltd. (KR)

( * ) Notice: Subject to any disclaimer, the term of this patent is extended or adjusted under 35 U.S.C. 154(b) by 448 days.

(21) Appl. No.: 11/745,548

(22) Filed: May 8, 2007

(65) Prior Publication Data

US 2007/0266415 A1 Nov. 15, 2007

(30) Foreign Application Priority Data

May 9, 2006 (KR) .................. 10-2006-0041568

(51) Int. Cl.
*H04N 7/173* (2011.01)
(52) U.S. Cl. .............. 725/87; 725/86; 725/91; 725/98; 725/103; 725/110; 725/114; 725/118; 725/119; 725/120
(58) Field of Classification Search .............. 725/36–61, 725/86–104, 114–120, 110, 121
See application file for complete search history.

(56) References Cited

U.S. PATENT DOCUMENTS

| | | | | |
|---|---|---|---|---|
| 7,020,652 | B2* | 3/2006 | Matz et al. ................... | 707/752 |
| 2002/0162114 | A1* | 10/2002 | Bisher et al. .................. | 725/91 |
| 2002/0194618 | A1* | 12/2002 | Okada et al. ................. | 725/132 |
| 2003/0126610 | A1 | 7/2003 | Ando | |
| 2003/0229899 | A1 | 12/2003 | Thompson et al. | |
| 2005/0155057 | A1* | 7/2005 | Wei ................................ | 725/38 |
| 2006/0020950 | A1 | 1/2006 | Ladd et al. | |
| 2007/0091919 | A1* | 4/2007 | Sandoval ...................... | 370/466 |
| 2009/0282440 | A1* | 11/2009 | Rodriguez .................... | 725/60 |

FOREIGN PATENT DOCUMENTS

| | | |
|---|---|---|
| EP | 1569103 A2 | 8/2005 |
| GB | 2407727 A | 5/2005 |
| JP | 2003179903 A | 6/2003 |

OTHER PUBLICATIONS

E. Schwalb., "iTV Handbook: Technologies & Standards," ACM Computers in Entertainment, vol. 2, No. 2, Prentice Hall PTR; 1st Edition, Jul. 25, 2003.
European Search Report dated Dec. 5, 2011 for European Patent Application No. 07009177.2.

* cited by examiner

*Primary Examiner* — Pankaj Kumar
*Assistant Examiner* — Alazar Tilahun
(74) *Attorney, Agent, or Firm* — Cantor Colburn LLP

(57) ABSTRACT

A head-end system for providing a two-way VOD service and a service method thereof are disclosed. The head-end system includes: a terminal which is based on a Java virtual machine and a Java TV/GEM standard middleware and has a VOD navigator application of a tool set form for replaying and controlling an audiovisual (AV) which is processed to be replayed in real time and an application related to the AV which is processed to be replayed in real time; and a two-way VOD head-end system server for providing a VOD content list and content information to the terminal through the Internet and providing information of an application related to an AV which is processed to be replayed and an application execution-related file together when a VOD content is selected and requested by a user.

8 Claims, 7 Drawing Sheets

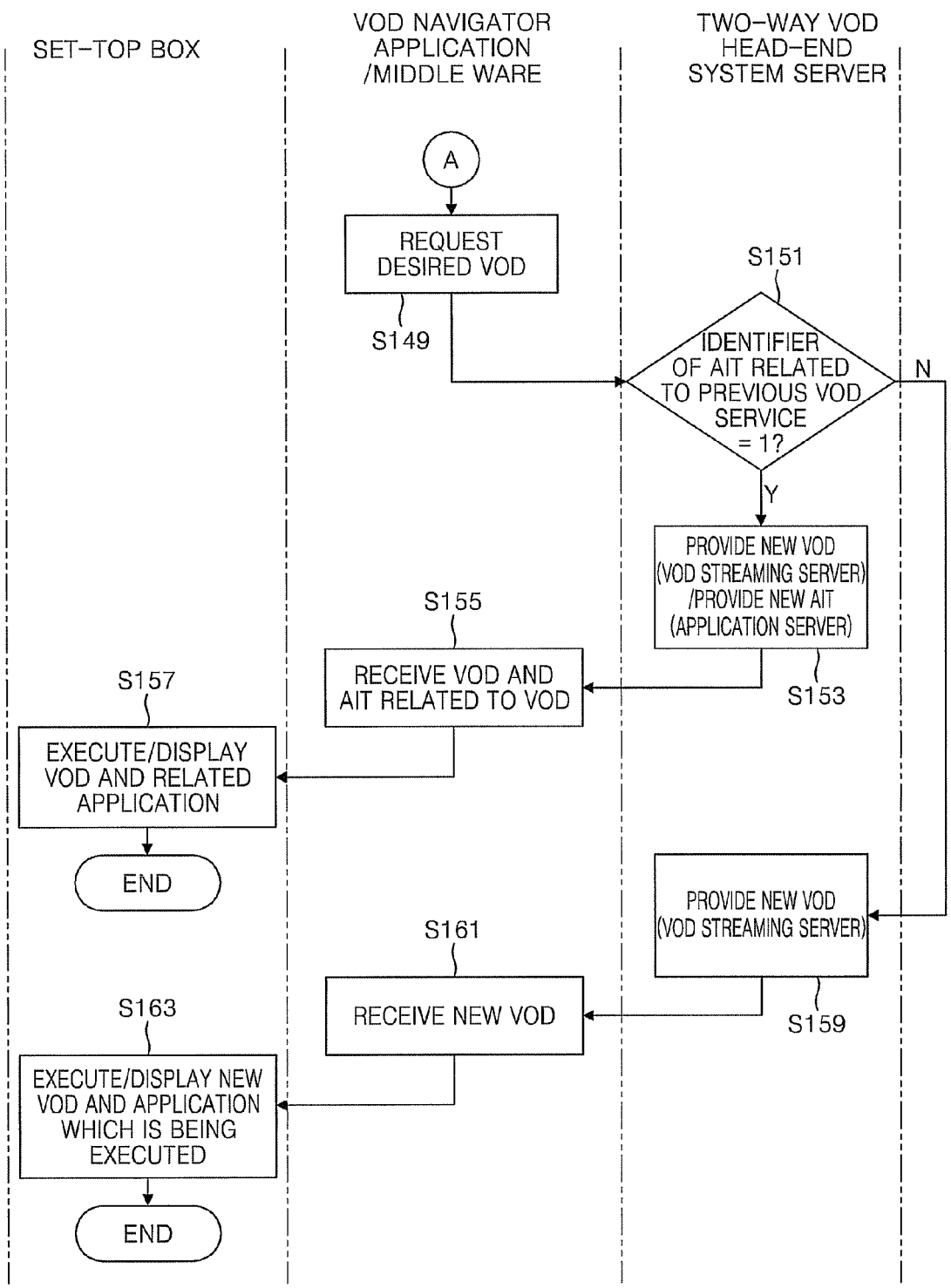

HEAD-END SYSTEM FOR PROVIDING TWO-WAY VOD SERVICE AND SERVICE METHOD THEREOF

CROSS-REFERENCE TO RELATED APPLICATION

This application claims priority to and the benefit of Korean Patent Application No. 2006-0041568, filed May 9, 2006, the disclosure of which is incorporated herein by reference in its entirety.

BACKGROUND OF THE INVENTION

1. Field of the Invention

The present invention relates to a head-end system for providing a two-way video on demand (VOD) service and a service method thereof and, more particularly, to a head-end system for providing a two-way VOD service in which an audiovisual (AV) which is processed to be replayed in real time based on a Java virtual machine and a Java TV/GEM standard middleware and an application related to the AV which is processed to be replayed in real time can be simultaneously provided without multiplexing of a discrete multiplexer and a service method thereof.

2. Description of the Related Art

A conventional data broadcasting is greatly divided into three: a cable TV data broadcasting, a satellite data broadcasting and a terrestrial digital TV data broadcasting. The cable TV data broadcasting uses an open cable application platform (OCAP), the satellite data broadcasting uses a multimedia home platform (MHP), and the terrestrial digital TV data broadcasting an advanced common application platform (ACAP).

A globally executable multimedia home platform (GEM) is a middleware which is developed focusing on interoperability so that a MHP method derived from a digital video broadcasting (DVB) method can be used in all methods. It uses a MHP standard at maximum and has been developed in consideration of both a technical restriction and a regional matter. It is not used alone but is used in a framework defined in a standard based on MHP.

A design rule of the GEM standard is defined so that applications produced by content producers can be interoperated with receivers based on other GEMs.

The GEM standard describes an application program interface (API), a protocol and a content format so that an MHP application can be driven in all iTVs and has an application to be provided through a network communication service rather than a DVB broadcasting service.

After the GEM was introduced, the federal communications commission (FCC) published a draft ACAP standard for harmonizing a digital TV application & software environment (DASE) which is an American terrestrial data broadcasting standard and the OCAP which is a cable data broadcasting standard in December 2003. Since OCAP 1.0 is in the process of standardization based on MHP 1.02, MHP which is an European data broadcasting standard, DASE which is an American terrestrial data broadcasting standard, and OCAP which is an American cable data broadcasting standard will be developed to ACAP. Most of companies in Korea employ a MHP middleware which is commercially available in consideration of such a development process.

Currently, KT Corp. in Korea and FastWeb in Italy are planning a two-way interactive VOD service which costs millions of dollars.

Transmission of a two-way application needs muxing equipment. However, the muxing equipment costs tens to hundreds of thousand dollars and should be installed in every telephone office, whereby there is a problem in that an initial investment cost is very high.

For these reasons, it has been considered to provide an application by using a http or https protocol which is relatively chip.

However, in conventional Java, an MPEG-2 based service is multiplexed and then transmitted together with an application information table (AIT) which is information of an application defined in MHP and GEM and a digital storage media-command and control (DSMCC) which is a mechanism for transmitting files defined in MPEG-2 based on MPEG-2, or an MPEG-2 TS with only AV is expressed.

Two-way standards such as GEM, MHP, ACAP, and OCAP are groping for a method for providing the AIT and application files through a web server, but there is no method for interoperating such an application and the AV so far. Therefore, a two-way digital broadcasting industry urgently needs a technique for multiplexing VOD information and VOD-related application information to be simultaneously serviced.

SUMMARY OF THE INVENTION

The present invention, therefore, solves aforementioned problems associated with conventional devices by providing a head-end system for providing a two-way video on demand (VOD) service in which an audiovisual (AV) which is processed to be replayed in real time based on a Java virtual machine and a Java TV/GEM standard middleware and an application related to the AV which is replayed in real time can be simultaneously provided without multiplexing of a discrete multiplexer and a service method thereof.

A first aspect of the present invention provides a head-end system for providing a two-way VOD service, comprising: a terminal which is based on a Java virtual machine and a Java TV/GEM standard middleware and has a VOD navigator application of a tool set form for replaying and controlling an audiovisual (AV) which is processed to be replayed in real time and an application related to the AV which is processed to be replayed in real time; and a two-way VOD head-end system server for providing a VOD content list and content information to the terminal through the Internet and providing information of an application related to an AV which is processed to be replayed and an application execution-related file together when a VOD content is selected and requested by a user.

The two-way VOD head-end system server comprises a navigator server for providing a VOD content list and content information to the terminal through the Internet; an application server for providing location information of an application information table containing an application related to a VOD content and an application execution-related file to the terminal through the Internet; and a VOD streaming server for providing location information of an AV which is replayed in real time to the terminal through the Internet.

The application information tale comprises an application list of a selected VOD content; an identifier of each application; location information for downloading each application; and attribute information of each application.

A second aspect of the present invention provides a method for providing a service in a system for providing a two-way VOD service, comprising: a terminal setting step for, at a terminal based on a Java virtual machine and a Java TV/GEM standard middleware, receiving a VOD navigator application from a two-way VOD head-end system server through the Internet and installing the VOD navigator application; a service requesting step for requesting an output of a VOD service list to the middleware through the VOD navigator application; and a VOD service providing step for the middleware displaying a VOD content list and information provided from the two-way VOD head-end system server on the terminal and replaying information of a VOD selected by a user and information of a related application.

The VOD service providing step comprises a VOD content displaying step for the middleware of the terminal displaying the VOD content list and information provided from the two-way VOD head-end system server; a selected VOD service requesting step for a user selecting a desired VOD among displayed VOD contents through the VOD navigator application of a toolset form to request information for a corresponding VOD; and a selected service replaying step for the middleware receiving and displaying information for the VOD selected by the user and location information of an AV which is processed to be replayed through the Internet from a VOD streaming server of a two-way VOD head-end system server, and receiving and displaying location information of an application information table containing an application related to a corresponding AV and an application execution-related file.

A third aspect of the present invention provides a method for providing a service in a system for providing a two-way VOD service, comprising: a terminal setting step for, at a terminal based on a Java virtual machine and a Java TV/GEM standard middleware, receiving a VOD navigator application from a two-way VOD head-end system server through the Internet and installing the VOD navigator application; a service requesting step for the VOD navigator application requesting an output of a VOD service list through the VOD navigator application; and a VOD service providing step for the VOD navigator application displaying a VOD content list and information provided from the two-way VOD head-end system server on the terminal and replaying information of a VOD selected by a user and information of a related application.

The VOD service providing step comprises a VOD content displaying step for the VOD navigator application of the terminal displaying the VOD content list and information provided from the two-way VOD head-end system server; a selected VOD service requesting step for a user selecting a desired VOD among displayed VOD contents through the VOD navigator application of a toolset form to request information for a corresponding VOD; and a selected service replaying step for the VOD navigator application receiving and displaying information for the VOD selected by the user and location information of an AV which is processed to be replayed through the Internet from a VOD streaming server of a two-way VOD head-end system server, and receiving and displaying location information of an application information table containing an application related to a corresponding AV and an application execution-related file.

The application information tale comprises an application list of a selected VOD content; an identifier of each application; location information for downloading each application; and attribute information of each application.

If the identifier of the application has a value of "1", when the VOD content selected and serviced by the user is changed into a new VOD content, the application information table (AIT) related to the serviced VOD content is finished, and an application information table (AIT) related to the new VOD content is provided from the application server and is displayed on the terminal, whereas if the identifier of the application has a value of "0", since the VOD content selected and serviced by the user and a new VOD content use the application information table (AIT) related to the same VOD, the already provided application information table (AIT) is not finished and is provided "as is".

BRIEF DESCRIPTION OF THE DRAWINGS

The above and other features of the present invention will be described in reference to certain exemplary embodiments thereof with reference to the attached drawings in which:

FIGS. 3a to 3c are detailed flowcharts illustrating the service method of the head-end system according to the exemplary embodiment of the present invention.

DETAILED DESCRIPTION OF THE INVENTION

Figure 1:
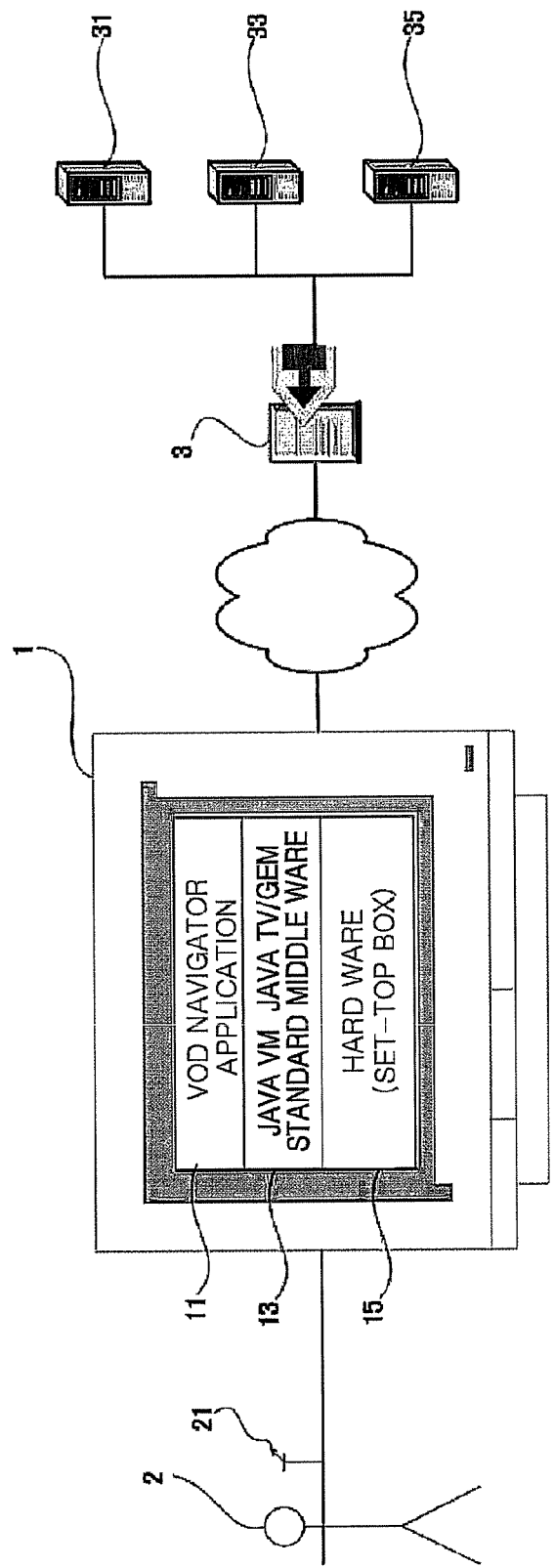
FIG. 1 is a system diagram illustrating a head-end system for providing a two-way VOD service according to an exemplary embodiment of the present invention.

Reference will now be made in detail to the embodiments of the present invention, examples of which are illustrated in the accompanying drawings, wherein like reference numerals refer to the like elements throughout. The embodiments are described below in order to explain the present invention by referring to the figures.

Figure 2:
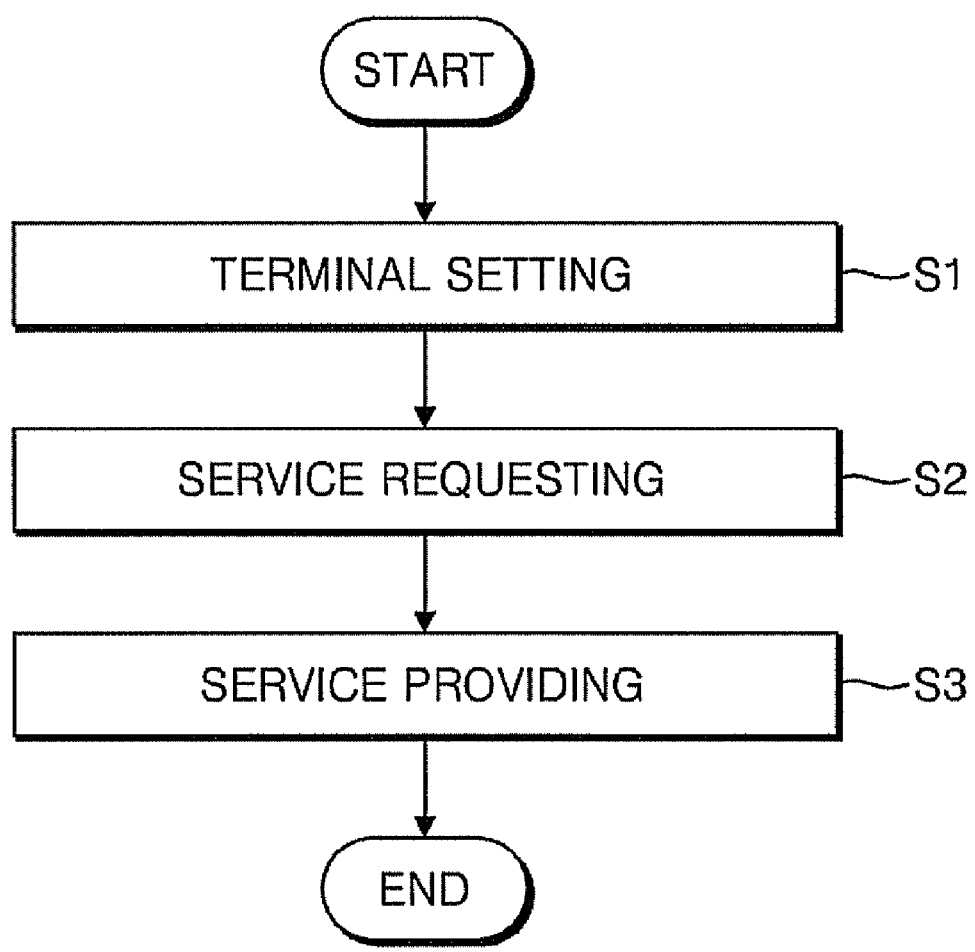
FIG. 2 is a schematic flowchart illustrating a service method of the head-end system according to the exemplary embodiment of the present invention.
Figure 3A:
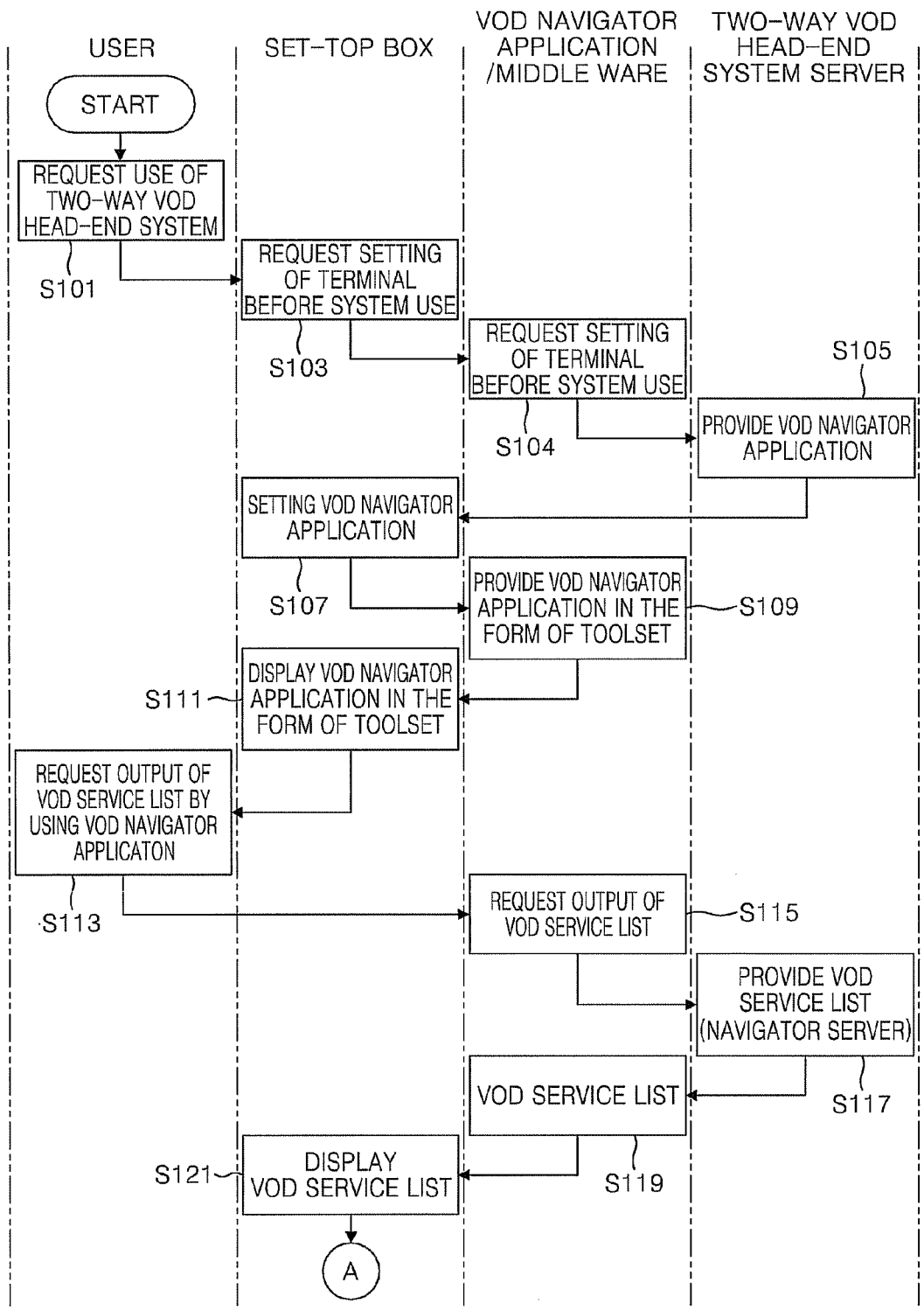
Figure 3B:
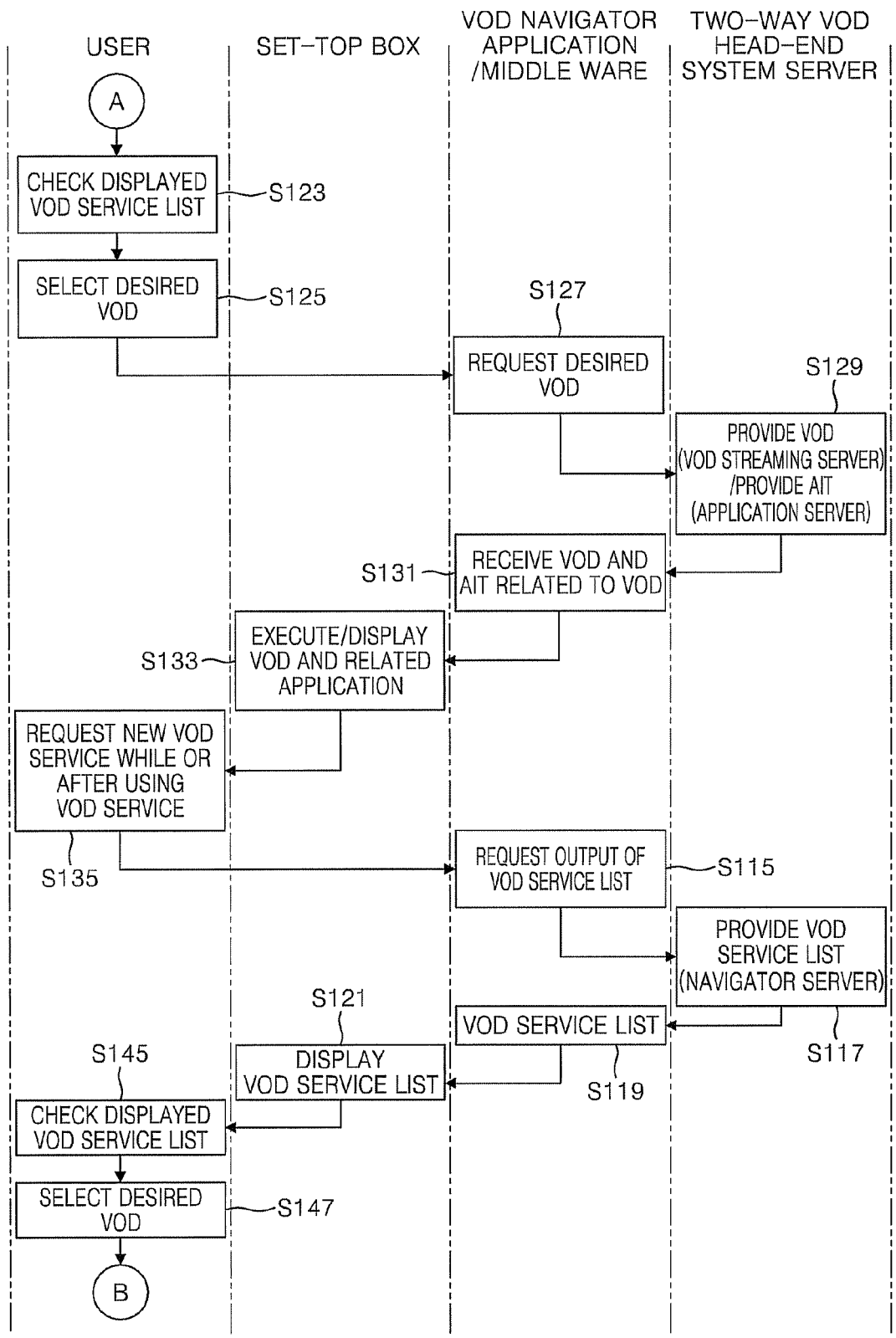

FIG. 1 is a system diagram illustrating a head-end system for providing a two-way VOD service according to an exemplary embodiment of the present invention. FIG. 2 is a schematic flowchart illustrating a service method of the head-end system according to the exemplary embodiment of the present invention. FIGS. 3a to 3c are detailed flowcharts illustrating the service method of the head-end system according to the exemplary embodiment of the present invention. FIGS. 4 and 5 and FIGS. 6a and 6b are screens illustrating graphic user interfaces of the two-way VOD service according to the exemplary embodiment of the present invention.

Referring to FIG. 1, the head-end system for providing the two-way VOD service according to the exemplary embodiment of the present invention comprises a terminal 1 and a head-end system server 3.

The terminal 1 comprises a VOD navigator application, a GEM standard middleware 13, and set-top box 15. The terminal 1, i.e., the set-top box 15 provides a VOD service to a user 2 and is based on a Java virtual machine and a Java TV/GEM standard middleware 13.

The GEM standard middleware 13 is configured so that applications produced by content producers can be directly interoperated with receivers based on other GEMs.

The GEM standard middleware 13 is applied to the set-top box because GEM defines an API, a protocol and a content format so that an MHP application can be driven in all iTVs and has an application to be provided through a network communication service rather than a DVB broadcasting service.

The VOD navigator application 11 of a toolset form replays and controls an AV which is processed to be replayed in real time and an AV-related application. A user 2 can be provided with a VOD service by manipulating functional keys arranged on the terminal 1 or a remote controller 21 to control the head-end system.

The two-way VOD head-end system server 3 provides a VOD content list and content information to the terminal 1 through an Internet and provides information of an application related to an AV which is processed to be replayed in real time and an application execution-related file together to the terminal 1 when the user 2 selects and requests a desired VOD content.

The two-way VOD head-end system server 3 comprises a navigator server 31 for providing a VOD content list and content information to the terminal 1 through the Internet, an application server 33 for providing location information of an application information table (AIT) which contains an application related to the VOD content and the application execution-related file to the terminal 1 through the Internet, and a VOD streaming server 35 for providing location information of the AV which is replayed in real time to the terminal 1 through the Internet.

A service method of the head-end system according to the exemplary embodiment of the present invention comprises a terminal setting step S1 for receiving the VOD navigator application 11 from the two-way VOD head-end system server 3 through the Internet and installing it in the terminal 3 which is based on the Java virtual machine and the Java TV/GEM standard middleware 13, a service requesting step S3 for the user 2 manipulating the VOD navigator application 11 in the terminal 1 to request the middleware 13 to output a VOD service list, and a VOD service providing step S5 for the middleware 13 displaying the VOD content list and the content information provided from the two-way VOD head-end system server 3 through the Internet to the user 2 through the terminal 1 and replaying information of a VOD selected by the user 2 and the related application information.

The service method of the head-end system according to the exemplary embodiment of the present invention is described below in more detail with reference to FIGS. 3a to 3c.

If the user 2 requests a use of the two-way VOD head-end system by manipulating the set-top box 15 (S101, S103 and S104), the Java virtual machine and the Java TV/GEM standard middleware 13 which is a basis of the set-top box 15 requests setting of the set-top box 15 through the Internet.

The two-way VOD head-end system server 3 which has received the request provides a VOD navigator application to the terminal 1 (S105).

The VOD navigator application is installed based on the Java mutual machine and the Java TV/GEM standard middleware 13 of the set-top box 15 (S107), completing the setting step (S1) of the terminal 1.

The VOD navigator application 11 is provided in the form of a toolset to the set-top box 15 based on the Java virtual machine and the Java TV/GEM standard middleware 13 (S109) and is displayed to the user 2 through the set-top box 15 in the form of a toolset which can be manipulated by the user 2 (S111).

The user 2 requests an output of the VOD service list through the VOD navigator application 11 (S113), and the VOD navigator application 11 transfers the request to the Java virtual machine and the Java TV/GEM standard middleware 13, so that the Java virtual machine and the Java TV/GEM standard middleware 13 accesses the two-way VOD head-end system server 3 through the Internet to request an output of the VOD service list (S115).

Alternatively, the VOD navigator application 11 may directly access the two-way VOD head-end system server 3 through the Internet to request an output of the VOD service list (S115).

The two-way VOD head-end system server 3 transfers the VOD service list to the VOD navigator application 11 or the Java virtual machine and the Java TV/GEM standard middleware 13 from the navigator server 31 which provides the VOD content list and the corresponding information (S119).

The VOD service list is displayed on the set-top box 15 so that the user 2 can select a desired VOD content (S121).

The user 2 checks the VOD content list and the corresponding information (S213) and then manipulates functional keys on the set-top box 15 or the remote controller 21 to select a desire VOD content (S125).

The VOD navigator application 11 or the Java virtual machine and the Java TV/GEM standard middleware 13 requests the selected VOD content information to the two-way VOD head-end system server through the Internet (S127).

For the requested VOD, the two-way VOD head-end system server 3 receives location information of the AV which is replayed in real time from the VOD streaming server 33 and receives location information of the AIT which contains an application related to the VOD content and an application execution-related file from the application server 35, and then transmits them (S129).

These are displayed on the set-top box 15 to the user 2 by the VOD navigator application 11 or the Java virtual machine and the Java TV/GEM standard middleware 13 (S133).

The application information table (AIT) contains an application list of the selected VOD content, an identifier of each application, location information through which each application can be downloaded, and attribute information of each application.

In this exemplary embodiment, let us assume that an event for replaying a new VOD occurs while using a service by executing and displaying the VOD and a related application which are provided through the above-described procedure (S135).

The VOD navigator application 11 or the Java virtual machine and the Java TV/GEM standard middleware 13 repeatedly perform the steps S115, S117, S119, and S121 so that the user 2 can select a desired VOD content.

The user 2 checks the VOD content list (S145) to select a desired VOD (S147).

When the VOD navigator application 11 or the Java virtual machine and the Java TV/GEM standard middleware 13 request to the two-way VOD head-end system server 3 so that the user 2 can select a desired VOD content, the system server 3 finds and checks an identifier of an application from the application information table (AIT) related to the previously executed VOD.

If the identifier of the application has a value of "1", the application information table (AIT) related to the serviced VOD content is finished when the VOD content already selected and serviced by the user is changed into a new VOD content, and an application information table (AIT) related to the new VOD content is provided from the application server (S153 and S155) and is displayed on the set-top box 15 (S157). However, if the identifier of the application has a value of "0", since it is determined that the VOD content selected and serviced by the user and a new VOD content use the application information table (AIT) related to the same VOD, the already provided application information table (AIT) is not finished and is provided "as is", and only the selected VOD is provided from the VOD streaming server 35 (S159 and S161) and displayed on the set-top box 15 (S163).

Figure 4:
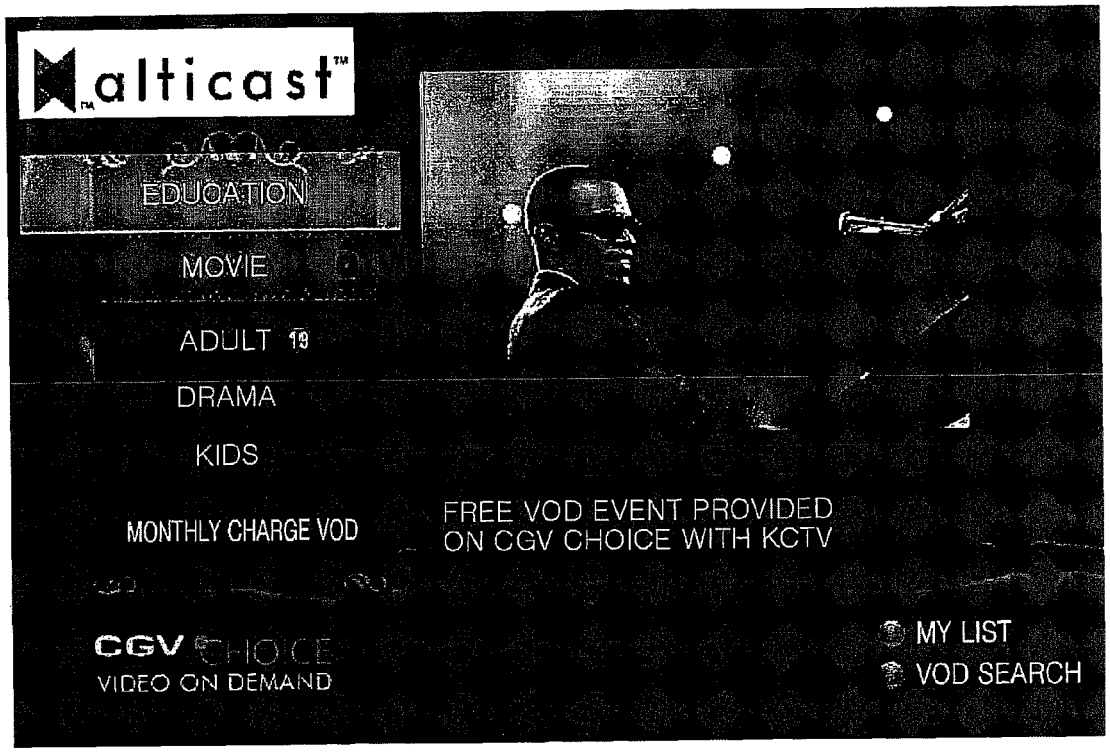
FIGS. 4 and 5 and FIGS. 6a and 6b are screens illustrating graphic user interfaces of the two-way VOD service according to the exemplary embodiment of the present invention.

The graphic user interfaces for providing the service method of the head-end system according to the present invention are shown in FIGS. 4, 5, 6a, 6b, and 7. FIG. 4 shows a screen that the VOD content list (i.e., genre list) provided from the VOD navigator is displayed on the set-top box.

Figure 5:
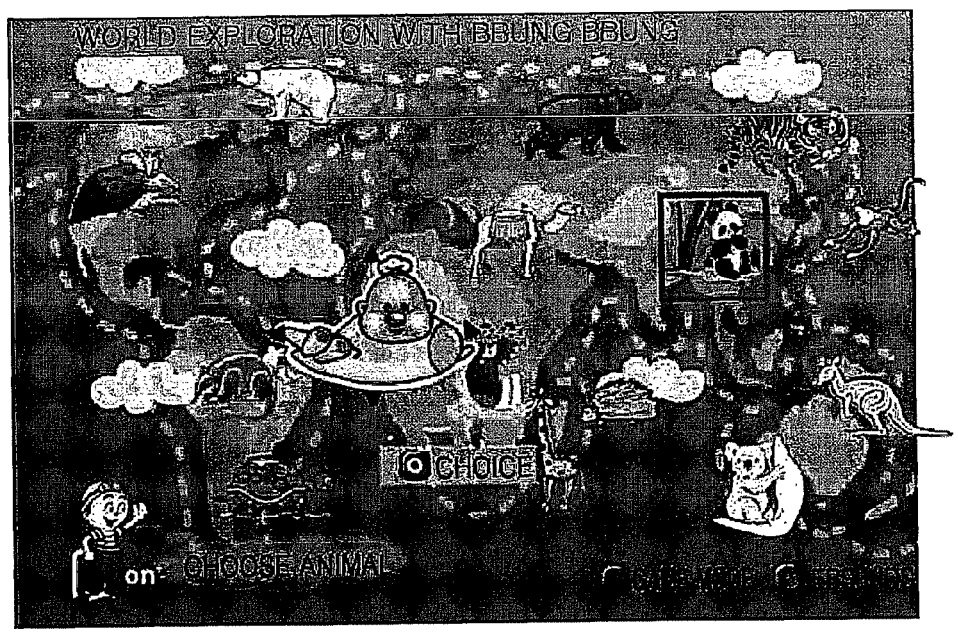

FIG. 5 also shows a screen that a VOD content list is displayed. In FIG. 5, when an animal picture (panda, tiger, camel, etc.) of each country is selected, the VOD service is selected interoperatably.

Figure 6A:
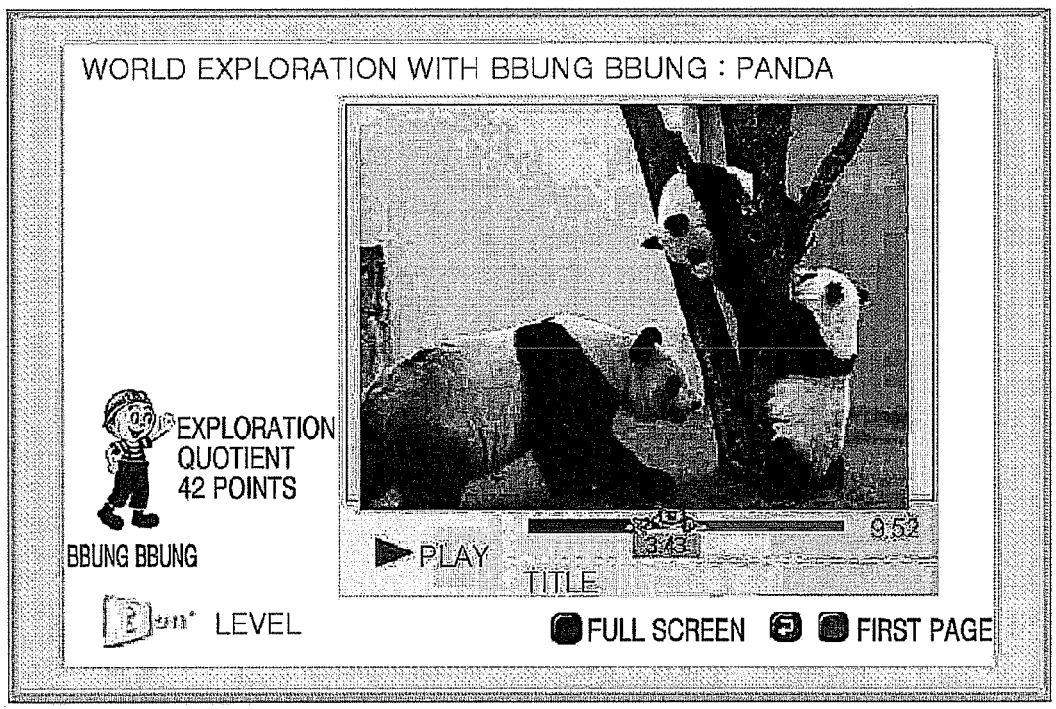
Figure 6B:
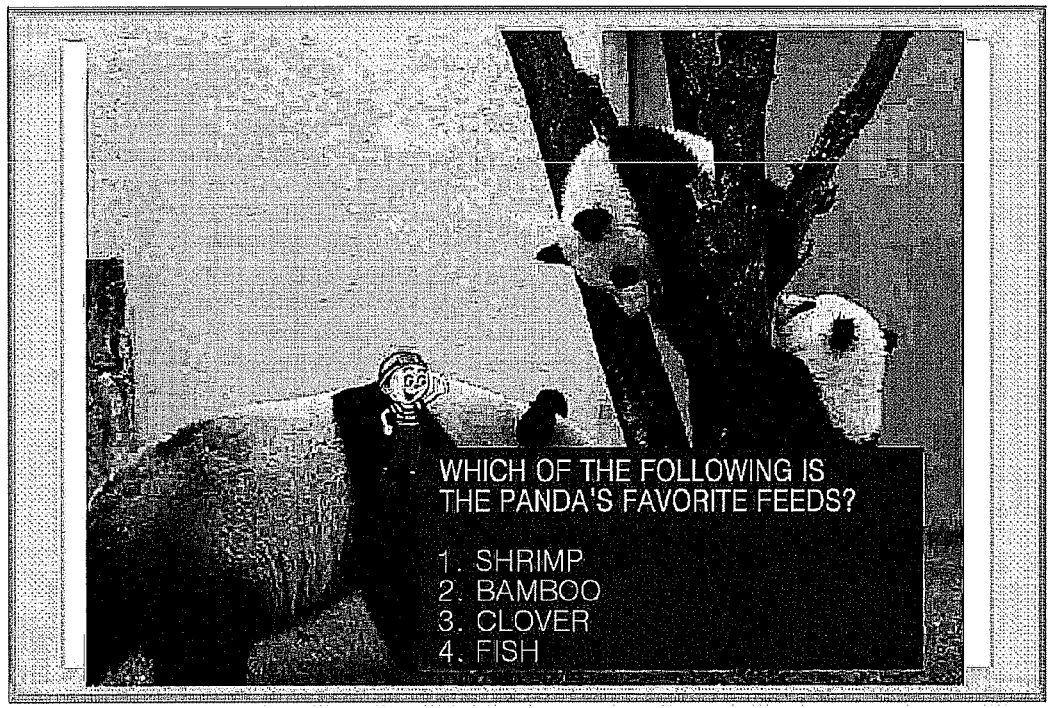

FIG. 6a shows that a certain VOD content selected from the VOD content list is serviced, and FIG. 6b shows that the VOD content-related application is executed. In FIG. 6a, a moving picture and a quiz are displayed at a predetermined time. Due to a moving picture effect, kids can easily be interested in studying.

As described above, when the VOD selected by the user is replayed, related applications of various forms which can increase a propagation effect of related text information or VOD can be simultaneously provided, whereby an information propagation effect is significantly increased, and it is possible for a user to get various information.

As described above, according to the present invention, it is possible to provide a two-way VOD service in which an AV which is processed to be replayed in real time based on a Java virtual machine and a Java TV/GEM standard middleware and an application related to the AV which is replayed in real time can be simultaneously provided without multiplexing of a discrete multiplexer. Thus, it can greatly contribute to development of a T-commerce industry.

Although the present invention has been described with reference to certain exemplary embodiments thereof, it will be understood by those skilled in the art that a variety of modifications and variations may be made to the present invention without departing from the spirit or scope of the present invention defined in the appended claims, and their equivalents.

What is claimed is:

1. A head-end system for providing a two-way VOD service, comprising:
   a terminal which is based on a Java virtual machine and a Java TV/GEM standard middleware and has a VOD navigator application of a tool set form for replaying and controlling an audiovisual (AV) which is processed to be replayed in real time and an application related to the AV which is processed to be replayed in real time; and
   a two-way VOD head-end system server for providing a VOD content list and content information to the terminal through the Internet and providing information of an application related to an AV which is processed to be replayed and an application execution-related file together when a VOD content is selected and requested by a user, the VOD content list and content information provided in response to a request via the VOD navigator application over the Internet;
   wherein the two-way VOD head-end system server is implemented via servers cooperatively processing requests from the terminal to convey content and content-related information as distinct transport schemes and without use of a multiplexor, the servers comprising:
   a navigator server for providing the VOD content list and content information to the terminal through the Internet;
   an application server for providing location information of an application information table containing an application relating to the VOD content and an application execution-related file to the terminal through the Internet; and
   a VOD streaming server for providing location information of the VOD content which is replayed in real time to the terminal through the Internet;
   wherein the terminal downloads the application information table from the application server using the location information of the application information table, and downloads the VOD content from the VOD streaming server using the location information of the VOD content;
   wherein an identifier of the application included in the application information table determines whether the application information table related to serviced VOD content is finished, so that the application information table related to new VOD content is provided from the application server and is displayed on the terminal.

2. The head-end system of claim 1, wherein the application information table comprises
   an application list of a selected VOD content;
   the identifier of each application;
   location information for downloading each application; and
   attribute information of each application.

3. A method for providing a service in a system for providing a two-way VOD service, comprising:
   a terminal setting step for, at a terminal based on a Java virtual machine and a Java TV/GEM standard middleware, receiving a VOD navigator application from a two-way VOD head-end system server through the Internet and installing the VOD navigator application;
   a service requesting step for requesting an output of a VOD service list to the middleware through the VOD navigator application; wherein requesting output of the VOD service list includes transmitting a request for the VOD service list over the Internet to the two-way VOD head-end system server; and
   a VOD service providing step for the middleware displaying a VOD content list and information provided from the two-way VOD head-end system server on the terminal and replaying information of a VOD content selected by a user and information of a related application;
   wherein the VOD service providing step comprises:
   a VOD content displaying step for the middleware of the terminal displaying the VOD content list and information provided from the two-way VOD head-end system server;
   a selected VOD service requesting step for a user selecting a desired VOD content among displayed VOD contents through the VOD navigator application of a toolset form to request information for the selected VOD content;
   a selected service receiving step for the middleware receiving location information of the selected VOD content which is processed to be replayed through the Internet from a VOD streaming server of the two-way VOD head-end system server, and receiving location information of an application information table containing an application related to the selected VOD content and an application execution-related file from an application server of the two-way VOD head-end system server; and
   a selected service replaying step for the middleware downloading and displaying the selected VOD content from the VOD streaming server using the location information of the selected VOD content, and downloading and displaying the application information table from the application server using the location information of the application information table;
   wherein providing the service includes implementing the service via servers cooperatively processing requests from the terminal to convey content and content-related information as distinct transport schemes and without use of a multiplexor;

wherein an identifier of the application included in the application information table determines whether the application information table related to serviced VOD content is finished, so that the application information table related to new VOD content is provided from the application server and is displayed on the terminal.

4. A method for providing a service in a system for providing a two-way VOD service, comprising:

a terminal setting step for, at a terminal based on a Java virtual machine and a Java TV/GEM standard middleware, receiving a VOD navigator application from a two-way VOD head-end system server through the Internet and installing the VOD navigator application;

a service requesting step for the VOD navigator application requesting an output of a VOD service list through the VOD navigator application; wherein requesting output of the VOD service list includes transmitting a request for the VOD service list over the Internet to the two-way VOD head-end system server; and a VOD service providing step for the VOD navigator application displaying a VOD content list and information provided from the two-way VOD head-end system server on the terminal and replaying information of a VOD selected by a user and information of a related application;

wherein the VOD service providing step comprises:

a VOD content displaying step for the VOD navigator application of the terminal displaying the VOD content list and information provided from the two-way VOD head-end system server;

a selected VOD service requesting step for a user selecting a desired VOD among displayed VOD contents through the VOD navigator application of a toolset form to request information for the selected VOD content;

a selected service receiving step for the VOD navigator application receiving location information of the selected VOD content which is processed to be replayed through the Internet from a VOD streaming server of the two-way VOD head-end system server, and receiving location information of an application information table containing an application related to the selected VOD content and an application execution-related file from an application server of the two-way VOD head-end system server; and a selected service replaying step for the VOD navigator application downloading and displaying the selected VOD content from the VOD streaming server using the location information of the selected VOD content, and downloading and displaying the application information table from the application server using the location information of the application information table, wherein providing the service includes implementing the service via servers cooperatively processing requests from the terminal to convey content and content-related information as distinct transport schemes and without use of a multiplexor;

wherein an identifier of the application included in the application information table determines whether the application information table related to serviced VOD content is finished, so that the application information table related to new VOD content is provided from the application server and is displayed on the terminal.

5. The method of claim 3, wherein the application information table comprises
   an application list of a selected VOD content;
   the identifier of each application;
   location information for downloading each application; and
   attribute information of each application.

6. The method of claim 5, wherein if the identifier of the application has a value of "1", when the VOD content selected and serviced by the user is changed into the new VOD content, the application information table related to the serviced VOD content is finished, and the application information table related to the new VOD content is provided from the application server and is displayed on the terminal, whereas if the identifier of the application has a value of "0", since the VOD content selected and serviced by the user and the new VOD content use the application information table related to the same VOD, the already provided application information table is not finished and is provided "as is".

7. The method of claim 4, wherein the application information table comprises
   an application list of a selected VOD content;
   the identifier of each application;
   location information for downloading each application; and
   attribute information of each application.

8. The method of claim 7, wherein if the identifier of the application has a value of "1", when the VOD content selected and serviced by the user is changed into the new VOD content, the application information table related to the serviced VOD content is finished, and the application information table related to the new VOD content is provided from the application server and is displayed on the terminal, whereas if the identifier of the application has a value of "0", since the VOD content selected and serviced by the user and the new VOD content use the application information table related to the same VOD, the already provided application information table is not finished and is provided "as is".

* * * * *